(12) United States Patent
Matsumoto et al.

(10) Patent No.: US 9,070,484 B2
(45) Date of Patent: Jun. 30, 2015

(54) REACTOR SERVICING PLATFORM

(75) Inventors: Jack Toshio Matsumoto, Sunnyvale, CA (US); Christopher Welsh, Livermore, CA (US); Gregory Francisco, Glencoe, CA (US)

(73) Assignee: GE-HITACHI NUCLEAR ENERGY AMERICAS LLC, Wilmington, NC (US)

( * ) Notice: Subject to any disclaimer, the term of this patent is extended or adjusted under 35 U.S.C. 154(b) by 1896 days.

(21) Appl. No.: 11/777,520

(22) Filed: Jul. 13, 2007

(65) Prior Publication Data

US 2010/0020914 A1    Jan. 28, 2010

(51) Int. Cl.
*G21C 19/00* (2006.01)
*G21C 19/20* (2006.01)
*B66F 11/04* (2006.01)
*E04G 1/36* (2006.01)

(52) U.S. Cl.
CPC .............. *G21C 19/20* (2013.01); *B66F 11/044* (2013.01); *E04G 1/36* (2013.01); *G21Y 2002/304* (2013.01); *G21Y 2004/30* (2013.01); *G21Y 2004/50* (2013.01)

(58) Field of Classification Search
USPC ................. 376/260, 261, 294, 263, 268, 249; 182/142
See application file for complete search history.

(56) References Cited

U.S. PATENT DOCUMENTS

| | | | |
|---|---|---|---|
| 2,606,078 A * | 8/1952 | Brock | 182/2.5 |
| 2,995,259 A | 8/1961 | Rose | |
| 3,072,215 A * | 1/1963 | Rush | 182/2.8 |
| 3,385,398 A * | 5/1968 | Garnett | 182/46 |
| 3,387,721 A | 6/1968 | Ludwig | |
| 3,438,857 A | 4/1969 | Sulzer | |
| 3,960,242 A * | 6/1976 | Saxonmeyer | 182/36 |
| 4,120,378 A * | 10/1978 | Mills et al. | 182/14 |
| 4,200,172 A * | 4/1980 | Meuschke et al. | 182/46 |
| 4,366,591 A * | 1/1983 | Zimmerman | 14/71.3 |
| 4,475,625 A * | 10/1984 | Clements | 182/113 |
| 4,518,059 A * | 5/1985 | Frey-Wigger | 182/2.7 |
| 4,646,875 A * | 3/1987 | Sholl | 182/2.6 |
| 4,744,718 A * | 5/1988 | Logan et al. | 414/724 |
| 5,084,936 A * | 2/1992 | Thomas, Jr. | 14/71.5 |
| 6,405,114 B1* | 6/2002 | Priestley et al. | 701/50 |
| 6,856,663 B2* | 2/2005 | Colditz et al. | 376/260 |

(Continued)

FOREIGN PATENT DOCUMENTS

JP    2005-300181 A    10/2005
JP    2005-331245       12/2005

(Continued)

OTHER PUBLICATIONS

Merriam-Webster's Collegiate Dictionary, 10th Edition, p. 842.*

(Continued)

*Primary Examiner* — Jack W Keith
*Assistant Examiner* — Marshall O'Connor
(74) *Attorney, Agent, or Firm* — Harness, Dickey & Pierce, P.L.C.

(57) ABSTRACT

A servicing platform for a nuclear reactor refueling floor is provided. In various embodiments, the servicing platform includes a base structured to be anchored to a refueling floor of the nuclear reactor. The servicing platform additionally includes a telescoping mast having a mounting collar at a first end that is rotationally attached to the base, and a personnel work basket pivotally coupled to a second end of the mast.

20 Claims, 3 Drawing Sheets

(56) References Cited

U.S. PATENT DOCUMENTS

| | | | |
|---|---|---|---|
| 6,856,664 B2 * | 2/2005 | Pence et al. | 376/260 |
| 7,139,357 B2 | 11/2006 | Colditz et al. | |
| 7,267,019 B2 | 9/2007 | Morris et al. | |
| 2002/0197135 A1 | 12/2002 | Arntzen et al. | |

FOREIGN PATENT DOCUMENTS

| | | | |
|---|---|---|---|
| JP | 2005-331245 A | 12/2005 | |
| JP | 2007-155739 A | 6/2007 | |

OTHER PUBLICATIONS

Japanese Office Action dated May 7, 2014 for corresponding Japanese Application No. 2008-180840.

Mexican Office Action dated Apr. 29, 2013 for corresponding Mexican Application No. MX/a/2008/009006.

Japanese Office Action dated Jun. 18, 2013 for corresponding Japanese Application No. 2008-180840.

Mexican Office Action dated Jan. 17, 2015 for corresponding Mexican Patent Application No. 2008/009006 (with translation).

* cited by examiner

REACTOR SERVICING PLATFORM

FIELD

The present teachings relate to systems and methods for performing inspections, maintenance and refueling tasks on a nuclear reactor pressure vessel.

BACKGROUND

The statements in this section merely provide background information related to the present disclosure and may not constitute prior art.

Nuclear reactor pressure vessels periodically require inspection, maintenance and refueling. To perform inspections, maintenance and refueling work, reactor personnel must be able to access various areas of the pressure vessel. Typically, to obtain such access, the refueling floor, i.e., area around the pressure vessel, includes large platforms that allow personnel to work around and over the vessel. For example, some refueling floors may include large fixed annular platforms around the periphery of the vessel that allow personnel to access the walls and peripheral area of the vessel by walking around the platform and to access the center area via buggy devices, hoists or winch-like devices mounted to the annular platforms. Other refueling floors may include bridge structures that span the vessel and are mounted to tracks along opposing sides of the vessel. To allow personnel access to the vessel, the bridge may be moved along the tracks to position the bridge across the vessel at a desired location.

Although such known service platforms are generally sufficient to perform the necessary maintenance and refueling tasks, they are typically designed and constructed to accommodate the particular structural specifics and configuration of each respective reactor.

SUMMARY

According to one aspect, a servicing platform for a nuclear reactor refueling floor is provided. In various embodiments, the servicing platform includes a base structured to be anchored to a refueling floor of the nuclear reactor. The servicing platform additionally includes a telescoping mast having a mounting collar at a first end that is rotationally attached to the base, and a personnel work basket pivotally coupled to a second end of the mast.

According to another aspect, a nuclear reactor is provided. In various embodiments the nuclear reactor comprises a refueling floor that includes a reactor vessel located within a reactor vessel cavity formed in the refueling floor. The reactor additionally includes at least one servicing platform anchored to the refueling floor. Each servicing platform includes a base structured to be anchored to the refueling floor adjacent a wall of the reactor vessel cavity. Each servicing platform also includes a telescoping mast having a mounting collar at a first end that is rotationally attached to the base such that the mast may be cantilevered past the reactor vessel cavity wall and over the reactor vessel. The servicing platform further includes a personnel work basket pivotally coupled to a second end of the mast for supporting personnel above the reactor vessel.

According to yet another aspect, a servicing platform for a nuclear reactor refueling floor is provided, wherein, in accordance with various embodiments, the servicing platform includes a base structured to be anchored to a refueling floor of a nuclear reactor adjacent a wall of a reactor vessel cavity formed in the refueling floor. Additionally, the servicing platform includes a telescoping mast that comprises a mounting collar at a first end rotationally attached to the base such that the mast may be cantilevered past the reactor vessel cavity wall and over a reactor vessel located within the reactor vessel cavity. The telescoping mast also includes a substantially flat walking surface extending a length of a neck portion of the mast that extends between the mounting collar and the personnel work basket. The flat surface provides a walking surface for personnel to traverse the length of the neck portion for accessing a personnel work basket pivotally coupled to a second end of the mast. The personnel work basket is structured and operable to support personnel above the reactor vessel. In various embodiments, the personnel work basket includes four impermeable sidewalls impermeably connected to an impermeable bottom to provide a water-tight personnel work basket.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

DETAILED DESCRIPTION

Figure 1:
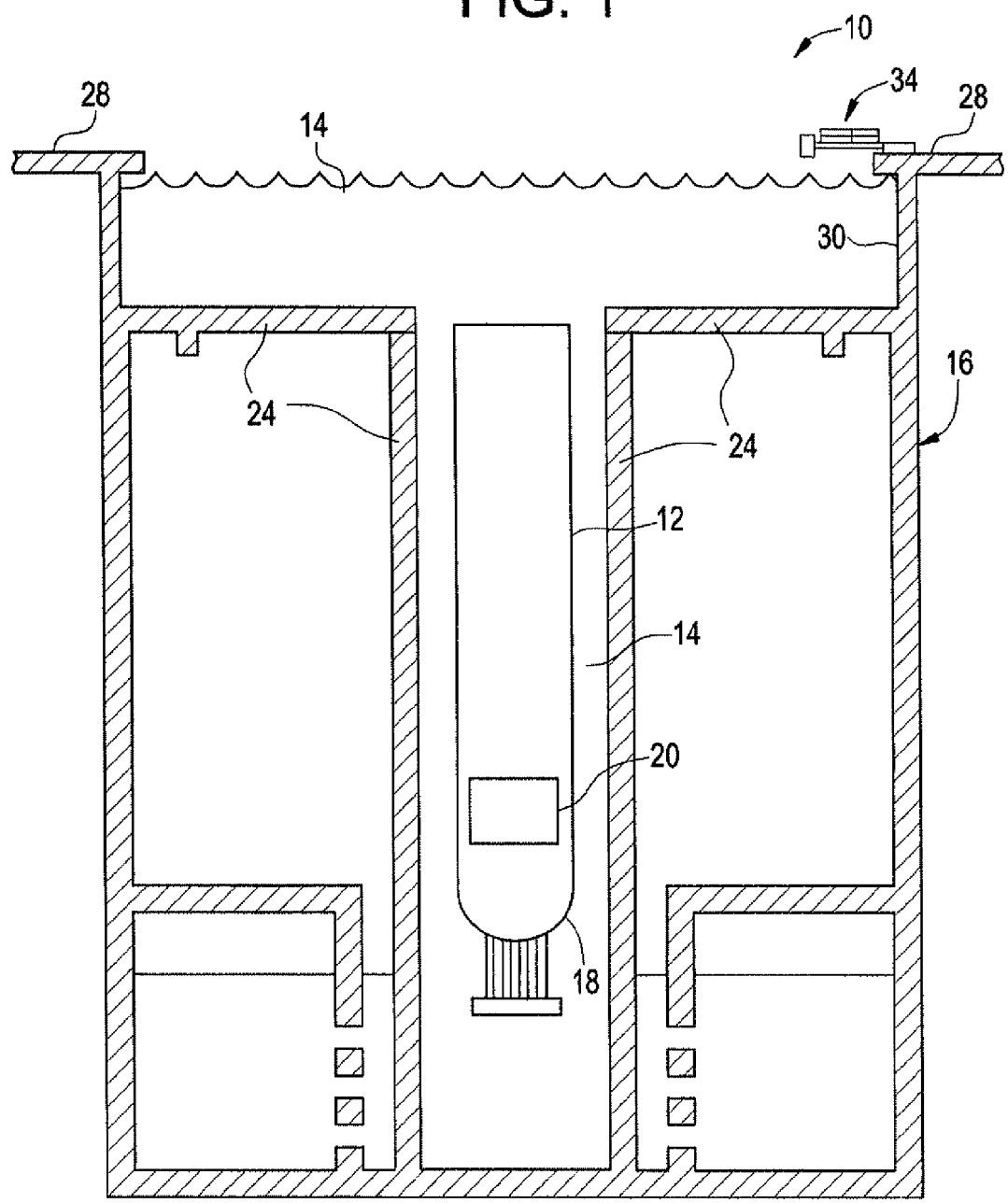
FIG. 1 is an exemplary schematic illustrating a cross-section of a boiling water nuclear reactor, in accordance with various embodiments of the present disclosure.

The following description is merely exemplary in nature and is in no way intended to limit the present teachings, application, or uses. Throughout this specification, like reference numerals will be used to refer to like elements.

Referring to FIG. 1, in various embodiments, an exemplary boiling water reactor (BWR) 10 includes a reactor pressure vessel 12 positioned within a pressure vessel cavity 14 of a containment vessel 16. The reactor pressure vessel 12 has a generally cylindrical shape and includes a bottom head 18, a removable top head (not shown) and a reactor core 20 located inside the pressure vessel 12.

Generally, the containment vessel 16 includes a drywell structure 24, in which the cavity 14 and pressure vessel 12 are located. A refueling floor 28 is located above the pressure and containment vessels 12 and 16 and extends radially outward from a side wall 30 of the containment vessel 16. The refueling floor 28 permits a worker access to the pressure and containment vessels 12 and 16 through a top opening of the cavity 14 to perform refueling, maintenance, and other servicing functions on the pressure vessel 12. In various embodiments, at least one servicing platform 34 is anchored to the refueling floor 28 at one or more locations around the top opening of the cavity 14. Each servicing platform 34 is structured and operable to allow reactor personnel access to the reactor internal components during refueling and maintenance outage operations. That is, the reactor servicing platform(s) 34 permit work crews and equipment to perform tasks at various locations around and over the reactor vessel 12.

Although the reactor 10 may include one or more servicing platforms 34, and in many embodiments will include a plurality of servicing platforms 34, each servicing platform 34 is substantially identical in form, structure and function. Thus, for simplicity and clarity, the one or more servicing platforms 34 will generally be described herein with reference to a single service platform 34.

Figure 2:
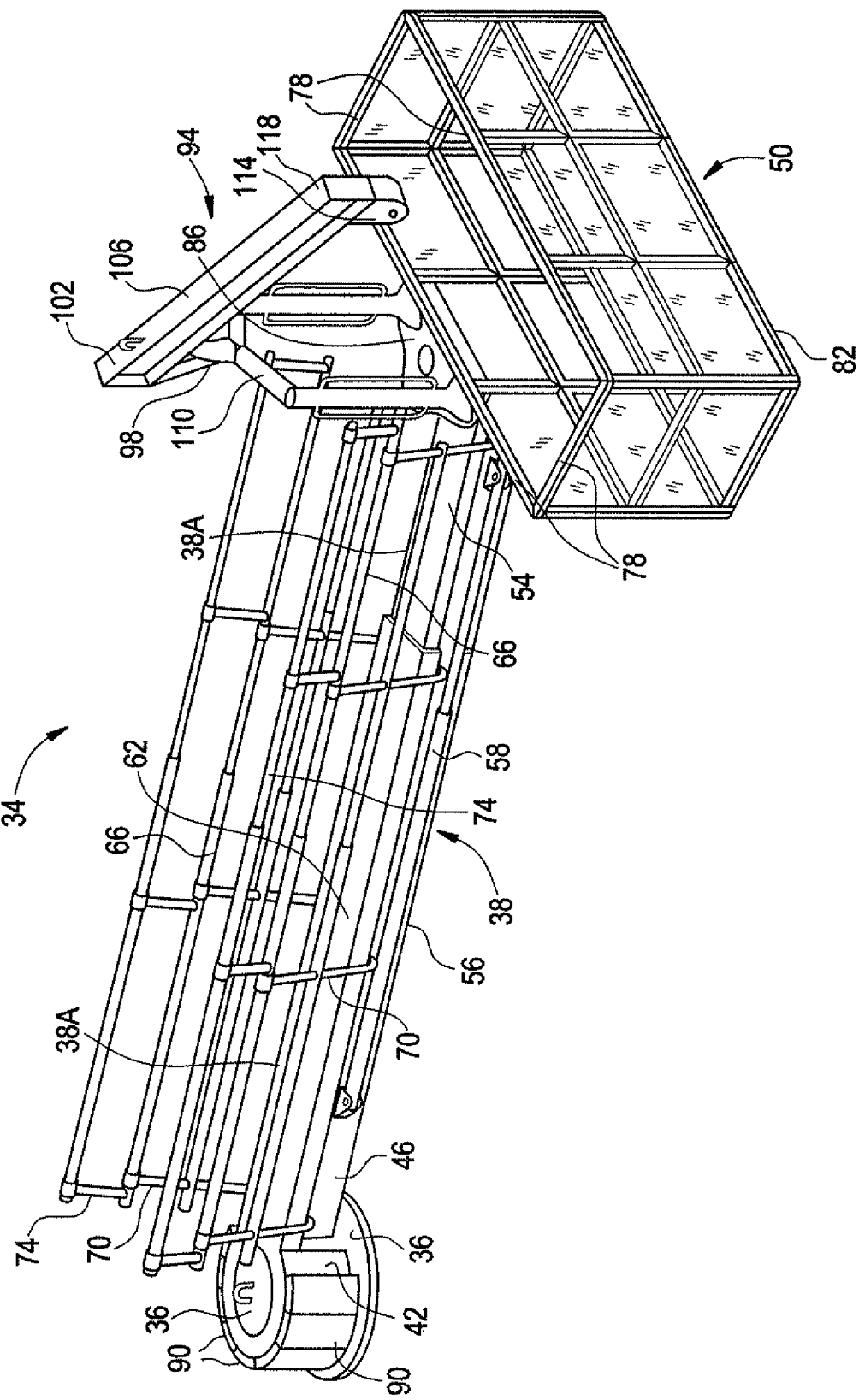
FIG. 2 is an isometric view of a servicing platform that may be anchored to a refueling floor of the boiling water nuclear reactor shown in FIG. 1, in accordance with various embodiments of the present disclosure.

Additionally referring to FIG. 2, in various embodiments, the servicing platform 34 includes a base 36 structured to be anchored to the refueling floor 28 adjacent the containment vessel side wall 30. The base 36 may be anchored to the refueling floor 28 generally at any desired location around the opening of the cavity 14. More specifically, the servicing platform 34 is structured and operable such that it may be installed and utilized, i.e., the base 36 may be anchored to the refueling floor 28, at generally any nuclear reactor, such as the BWR 10. Moreover, the reactor servicing platform 34 is structured and operable such that the servicing platform 34 may be installed at any reactor refueling floor, e.g., refueling floor 28, having any structure and configuration without special modification to the servicing platform 34.

The servicing platform 34 additionally includes a telescoping mast 38 having a mounting collar 42 at a first, or proximal, end 46. The mounting collar 42 is rotationally attached to the base 36 such that the mast 38 may be moved in a side-to-side arc over the reactor vessel 12. A personnel work basket 50 is pivotally coupled to a second, or distal, end 54 of the mast 38. The personnel work basket 50 is structured and operable to support personnel above the reactor vessel 12.

The mast 38 is structured and operable in a telescoping fashion such that the mast distal end 54, and thus the work basket 50, may be extended and cantilevered past the containment vessel side wall 30 and over a reactor vessel 12. The mast 38 may further be retracted to withdraw the distal end 54 and work basket near or over the containment vessel side wall 30. Thus, the personnel basket 50 may be extended away from the containment vessel side wall 30, to transport work personnel to approximately the center of the pressure vessel 12, or any other area above the pressure vessel 12 within the arc radius of the distal end 54 of mast 38. The mast 38 includes two or more telescopingly mated sections 38A that form a neck portion 56 of the mast 38 that is extendable and retractable via one or more actuators 58 mounted to one or more sides of the mast 38. Only one actuator 58 is visible in the isometric view of FIG. 2, but one skilled in the art would readily understand the location of other actuators 58 that may be implemented. The actuator(s) 58 may be any actuator suitable for extending and retracting the personnel basket 50, e.g., the actuators 58 may be electronic, hydraulic or pneumatic actuators.

In various embodiments, the mast 38 includes a substantially flat walking surface 62 that extends the length of a neck portion 56 extending between the mounting collar 42 and the personnel work basket 50. The walking surface 62 provides a walking surface for personnel to traverse the length of the mast 38 for ingress and egress to the personnel basket 50 from the refueling floor 28. In various other embodiments, the servicing platform 34 includes telescoping handrails 66 mounted along opposing sides of the mast neck portion 56. The handrails 66 are telescopingly structured to correspondingly extend and retract along with the mast 38 and provide stability to personnel traversing the neck portion 56. In various implementations, the handrails 66 may include a lower portion 70 and an upper portion 74 pivotally coupled to the lower portion 70. The lower portion 70 is structured to mount the respective handrail 66 to the mast 38. The upper portion 74 is pivotally coupled to the lower portion 70 such that the top portion 70 may be pivoted between an upright, deployed position and a folded down, stowed position.

The personnel work basket 50 includes four sidewalls 78 connected to a bottom 82 and is pivotally coupled to the distal end 54 of the mast neck portion 56 via a pivot mount 86. The pivot mount 86 is structured and operable to allow the personnel work basket 50 to be positioned at various horizontal angles at the distal end 54. In various embodiments, the personnel basket four sidewalls 78 and bottom 50 are fabricated to be impermeable to water and are impermeably connected. In such embodiments, the personnel basket 50 is substantially water-tight and may be at least partially submerged in water within the pressure vessel 12.

In other various embodiments, the servicing platform 34 includes one or more counterweights 90 attached to the collar 42. The counterweights 90 provide stability to the servicing platform 34 and counter balance the weight of the personnel basket 50 and any work personnel in the basket 50, thereby reducing the stress load on the base 36.

In yet other embodiments, the servicing platform 34 includes a boom assembly 94 mounted at the distal end 54 of the mast 54. In various implementations, the boom assembly 94 may be mounted to the personnel basket pivot mount 86, as illustrated in FIG. 2. The boom assembly 94 includes a 360° pivot mount 98 at a proximal end 102 of a spar arm 106. The boom assembly pivot mount 98 is pivotally connected to a boom assembly mounting structure 110 at the distal end 54 of the mast neck portion 56 such that the spar arm 106 may pivot 360° about the boom assembly mounting structure 110. In various embodiments, the boom assembly pivot mount 98 is also removably connected to a boom assembly mounting structure 110 such that the boom assembly 94 may be installed or removed as desired. Additionally, in various embodiments, the boom assembly mounting structure 110 is removably connected to the mast 38 or the personnel basket pivot mount 86.

In various forms the boom assembly 94 may include a retention and suspension mechanism 114 attached to a distal end 118 for retaining and suspending tool or reactor components over the personnel basket 50 and the pressure vessel 12. More specifically, in various implementations, the retention and suspension mechanism 114 may be a winch, hoist or pulley assembly operable to raise and lower tools or components into and out of the personnel basket 50 and the pressure vessel 12. Thus, work personnel may utilize the boom assembly 94 to position tools and/or reactor components over the pressure vessel 12 and further to raise and lower such tools and/or components into and out of the pressure vessel 12.

In still other embodiments, the mast neck portion 56 is pivotally coupled to the mounting collar 42. In such embodiments, the mast 38 is electrically, pneumatically or hydraulically structured and operable to raise and lower personnel basket 50 via the pivotal connection of the mast neck portion 56 and the mounting collar 42.

Thus, servicing platform 34 is structured and operable to position the personnel basket 50, and work personnel within the basket 50, anywhere over the pressure vessel that is within the maximum arc swing area of the servicing platform 34. That is, the telescoping mast 38 may be extended or retracted and pivoted about the base 36 to position the personnel basket 50 above the cavity peripheral wall, as far toward the center of the pressure vessel 12 as the mast 38 will extend, or anywhere therebetween. Additionally, in various embodiments, the servicing platform 34 is structured and operable to also raise and lower the personnel basket 50 such that the personnel basket 50 may be positioned above or submerged into the water within the pressure vessel 12.

Figure 3:
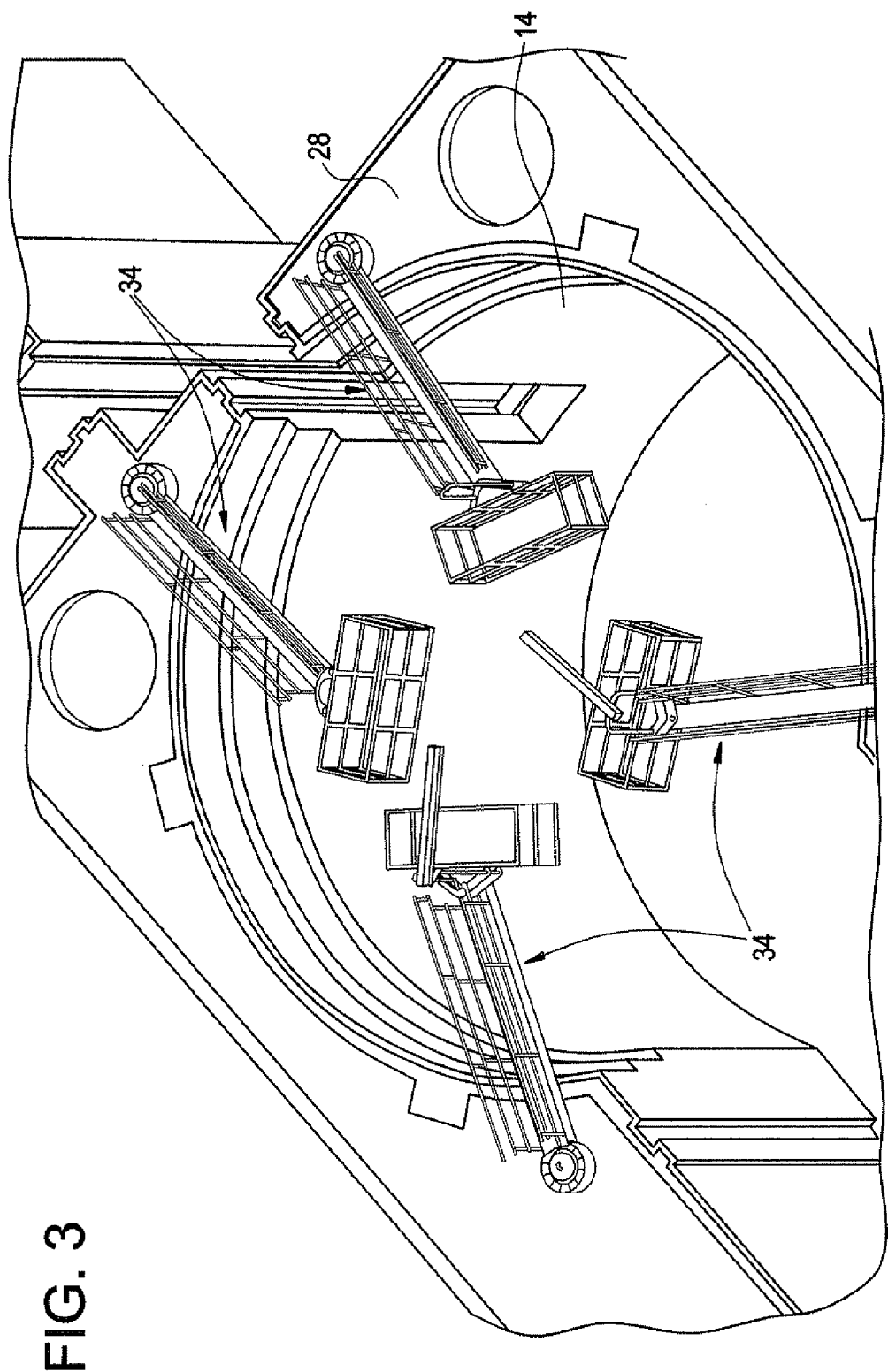
FIG. 3 is an isometric top view of a refueling floor of the exemplary boiling water nuclear reactor, shown in FIG. 1, having a plurality of servicing platforms, shown in FIG. 2, anchored thereto.

As illustrated in FIG. 3, a plurality of servicing platforms 34, e.g., two, three, four or more servicing platforms 34, may be anchored to the refueling floor 28 such that substantially the entire area above the pressure vessel cavity 14 and the pressure vessel 12 (not shown in FIG. 3) may be accessed by work personnel to perform inspection, maintenance and refueling tasks.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A servicing platform for a nuclear reactor refueling floor, said servicing platform comprising:
    a base structured to be anchored to a refueling floor of a nuclear reactor;
    a telescoping mast having a first section and a second section, the first section having a mounting collar at a first end of the telescoping mast, the mounting collar being rotationally attached to the base; and
    a personnel work basket pivotally coupled to the second section at a second end of the telescoping mast, wherein the first section includes a first walking surface and the second section includes a second walking surface, the first and the second sections being telescopingly mated so that the telescoping mast is extendible and retractable in a direction of the personnel work basket from the base, the first and the second walking surfaces together forming a substantially level and continuous walking surface between the personnel work basket and the base, so that personnel can walk entirely from the personnel work basket on to the base and vice versa via the walking surface.

2. The servicing platform of claim 1, wherein the personnel work basket includes four water impermeable sidewalls impermeably connected to a water impermeable bottom.

3. The servicing platform of claim 1, wherein the telescoping mast further includes telescoping handrails along opposing sides of the telescoping mast.

4. The servicing platform of claim 3, wherein each handrail includes a lower portion structured to mount the respective handrail to the telescoping mast and an upper portion pivotally coupled to the lower portion.

5. The servicing platform of claim 1, further comprising:
    at least one counterweight attached to the collar.

6. The servicing platform of claim 1, further comprising:
    a boom assembly mounted at the second end of the telescoping mast.

7. The servicing platform of claim 6, wherein the boom assembly includes a retention and suspension mechanism coupled to a distal end of a spar arm of the boom assembly.

8. The servicing platform of claim 7, wherein the boom assembly further includes a mounting structure mounted to one of the second end of the telescoping mast and a personnel work basket mount pivotally coupled to the second end of the telescoping mast, and wherein a proximal end of the spar arm is pivotally mounted to the boom assembly mounting structure.

9. A nuclear reactor comprising:
    a refueling floor including a reactor vessel located within a reactor vessel cavity formed in the refueling floor; and
    at least one servicing platform anchored to the refueling floor, each servicing platform comprising:
        a base anchored to the refueling floor adjacent a wall of the reactor vessel cavity;
        a telescoping mast having a first section and a second section, the first section having a mounting collar at a first end of the telescoping mast, the mounting collar being rotationally attached to the base such that the telescoping mast may be cantilevered past the reactor vessel cavity wall and over the reactor vessel; and
        a personnel work basket pivotally coupled to the second section at a second end of the telescoping mast, wherein the first section includes a first walking surface and the second section includes a second walking surface, the first and the second sections being telescopingly mated so that the telescoping mast is extendible and retractable in a direction of the personnel work basket from the base, the first and the second walking surfaces together forming a substantially level and continuous walking surface between the personnel work basket and the base, so that personnel can walk entirely from the personnel work basket on to the base and vice versa via the walking surface.

10. The reactor of claim 9, wherein the personnel work basket includes four sidewalls connected to a bottom to provide a water-tight personnel work basket.

11. The reactor of claim 9, wherein the telescoping mast further includes telescoping handrails along opposing sides of the telescoping mast for providing stability to personnel traversing the neck portion.

12. The reactor of claim 11, wherein each handrail includes a lower portion structured to mount the respective handrail to the telescoping mast and an upper portion pivotally coupled to the lower portion such that the top portion may be pivoted between an upright deployed position and a folded down stowed position.

13. The reactor of claim 9, further comprising:
    at least one counterweight attached to the collar to counter balance the telescoping mast and personnel work basket.

14. The reactor of claim 9, further comprising:
    a boom assembly mounted at the second end of the telescoping mast for supporting objects beyond the personnel work basket over the reactor vessel.

15. The reactor of claim 14, wherein the boom assembly includes at least one of a winch and a pulley assembly coupled to a distal end of a spar arm of the boom assembly.

16. The reactor of claim 15, wherein the boom assembly further includes,
    a mounting structure mounted to one of the second end of the telescoping mast, and
    a personnel work basket mount pivotally coupled to the second end of the telescoping mast, and wherein a proximal end of the spar arm is pivotally mounted to the boom assembly mounting structure.

17. A servicing platform for a nuclear reactor refueling floor, said servicing platform comprising:
    a base structured to be anchored to a refueling floor of a nuclear reactor adjacent a wall of a reactor vessel cavity formed in the refueling floor;
    a telescoping mast including;
        a mounting collar at a first end that is rotationally attached to the base such that the mast may be cantilevered past the reactor vessel cavity wall and over a reactor vessel located within the reactor vessel cavity, and
        a first walking surface and a second walking surface, the first and second walking surfaces extending a length of a neck portion of the mast, the neck portion extending between the mounting collar and a second end of the mast, the first and second walking surfaces together providing a substantially level and continuous walking surface for personnel to walk the entire length of the neck portion from the base to the second end of the mast and vice versa, the second walking surface being movable relative to the first walking surface in a direction in which the neck portion extends between the mounting collar and the second end of the mast; and a personnel work basket pivotally coupled to the second end of the mast for supporting personnel above the reactor vessel, the personnel work basket including four impermeable sidewalls impermeably connected to an impermeable bottom to provide a water-tight personnel work basket.

18. The servicing platform of claim 17, wherein the mast further includes telescoping handrails along opposing sides of the mast neck portion for providing stability to personnel traversing the neck portion, each handrail including a lower portion structured to mount the respective handrail to the mast and an upper portion pivotally coupled to the lower portion such that the top portion may be pivoted between an upright deployed position and a folded down stowed position.

19. The servicing platform of claim 1, wherein the second walking surface is movable relative to the first walking surface and is configured to move parallel to the first walking surface.

20. The servicing platform of claim 9, wherein the second walking surface is movable relative to the first walking surface and is configured to move parallel to the first walking surface.

* * * * *